B. S. BLAKE.
EGG RECEPTACLE.
APPLICATION FILED MAY 10, 1915.

1,179,998. Patented Apr. 18, 1916.

INVENTOR
Byron S. Blake
BY
H. W. Simms
his ATTORNEY

UNITED STATES PATENT OFFICE.

BYRON S. BLAKE, OF ROCHESTER, NEW YORK.

EGG-RECEPTACLE.

1,179,998.    Specification of Letters Patent.    Patented Apr. 18, 1916.

Application filed May 10, 1915. Serial No. 27,001.

*To all whom it may concern:*

Be it known that I, BYRON S. BLAKE, of the city of Rochester, in the county of Monroe and State of New York, have invented a new and useful Egg-Receptacle, fully set forth in the following specification and shown in the accompanying drawings.

The present invention relates to egg receptacles, and an object of the invention is to preserve the egg in an inexpensive manner without applying a coating to the exterior of the egg and without subjecting the egg to the action of air until the egg is ready for use, permitting the egg to be closed against air from the time that it is packed until it reaches the ultimate consumer.

To these and other ends, the invention consists in certain parts and combinations of parts all of which will be hereinafter described, the novel features being pointed out in the appended claims.

Figure 1:
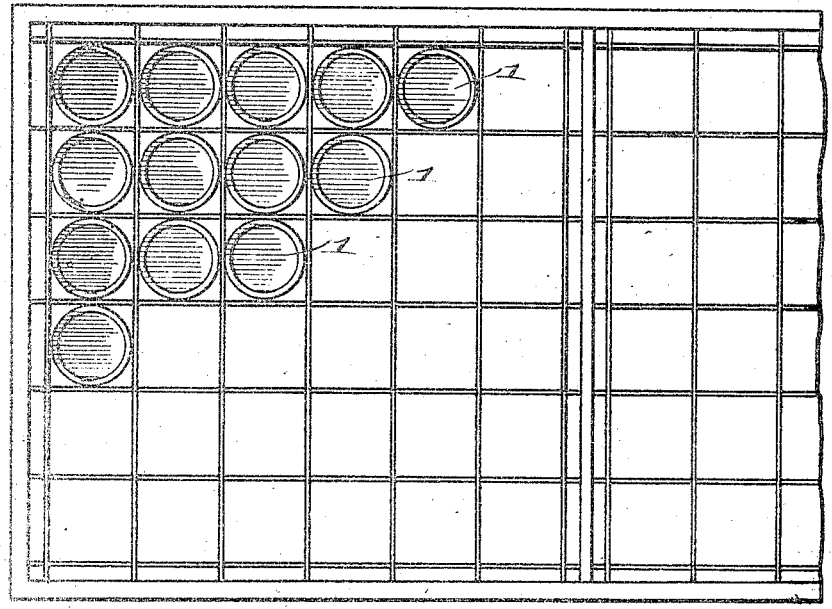
Figure 2:
Figure 3:
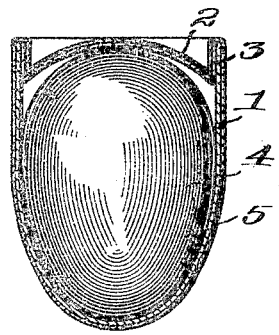

In the drawings: Figure 1 is a plan view of an ordinary egg crate with a number of the improved egg receptacles arranged therein; Fig. 2 is a view in elevation of one of the egg receptacles; and Fig. 3 is a vertical section through one of the egg receptacles showing an egg therein.

According to this invention, there is provided an individual receptacle for each egg. This receptacle, in this instance, embodies a body portion 1 which is preferably formed of paper or similar material and has its bottom or lower portion pointed, so as to conform interiorly to the pointed end of the egg and at the same time providing a pointed exterior wall which facilitates the introduction of the receptacle into an ordinary egg crate as will be hereinafter set forth. The upper portion of the body of the receptacle is preferably of cylindrical formation and is open at its top. Within this open top, a closure 2 may be fitted, having a concavo convex form and provided with a surrounding upwardly extending annular flange received within the cylindrical portion of the body. The egg 4 is introduced into the body portion with its pointed end downward, after which the closure 2 is fitted within the body portion. Then the receptacle as a whole is dipped in paraffin or other coating substance to form a film 5 over the exterior of the receptacle and thus exclude air from the egg without applying the coating directly to the egg. The packing of the egg may take place shortly after the egg is laid and the receptacle is then introduced into an ordinary celled egg crate. The form of the receptacle facilitates its introduction into the crate and insures that the egg will be held upright with the air cell uppermost. The egg crate is then placed in cold storage or in a cool place and held there until ready for sale.

According to this invention, each egg is individually inclosed against air without providing any coating directly upon the shell of the egg. The shape of the container is such that it requires no special crate but may be fitted in the ordinary celled egg crate. When in position in the crate, the air cell of the egg is uppermost and, in this way, the yolk is held out of contact with the shell, thus still further facilitating the preserving action. By keeping the eggs in cold storage, or in a cooled temperature, this preserving action is still further helped.

It is contemplated that the receptacles will be made inexpensive by special machinery and will not add materially to the cost of the eggs, enabling the eggs to be stored during the months that eggs are plentiful to be used when there is a scarcity.

What I claim as my invention and desire to secure by Letters Patent is:

1. An individual egg receptacle comprising a body portion having a reduced lower part and an upper part which projects to a plane at least as high as the upper end of an egg within the receptacle, a slip closure for the body portion received within the upper portion of said body portion, and a coating for said receptacle sealing the closure within the body portion.

2. An individual egg receptacle comprising a body portion having a pointed lower part and a cylindrical upper part, and a closure for the body portion of concavo convex form having a surrounding upwardly extending annular flange fitting within the cylindrical upper part of the body.

BYRON S. BLAKE.